(No Model.) 2 Sheets—Sheet 1.

I. LIBBEY.
WHEEL CULTIVATOR AND FURROWER.

No. 331,413. Patented Dec. 1, 1885.

WITNESSES.
J. M. Dolan
Fred. B. Dolan.

INVENTOR.
Ivory Libbey
by his atty
Clarke & Raymond.

(No Model.) 2 Sheets—Sheet 2.

I. LIBBEY.
WHEEL CULTIVATOR AND FURROWER.

No. 331,413. Patented Dec. 1, 1885.

WITNESSES.
J. M. Dolan.
Fred B. Dolan.

INVENTOR.
Jerry Libbey
by his attys
Clarke & Raymond.

UNITED STATES PATENT OFFICE.

IVORY LIBBEY, OF LEBANON, MAINE.

WHEEL CULTIVATOR AND FURROWER.

SPECIFICATION forming part of Letters Patent No. 331,413, dated December 1, 1885.

Application filed July 20, 1885. Serial No. 172,106. (No model.)

*To all whom it may concern:*

Be it known that I, IVORY LIBBEY, of Lebanon, in the county of York and State of Maine, have invented a new and useful Improvement in Wheel Cultivators and Furrowers, of which the following is a full, clear, and exact description, reference being had to the accompanying drawings, forming a part of this specification in explaining its nature, in which—

Figure 1:
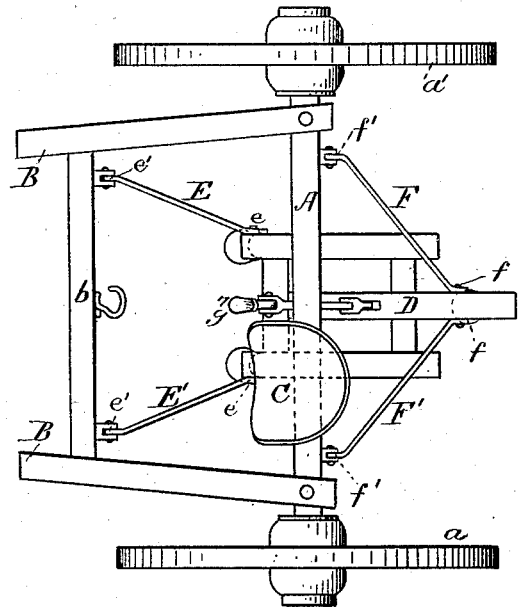
Figure 5:
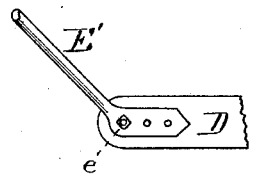
Figure 2:
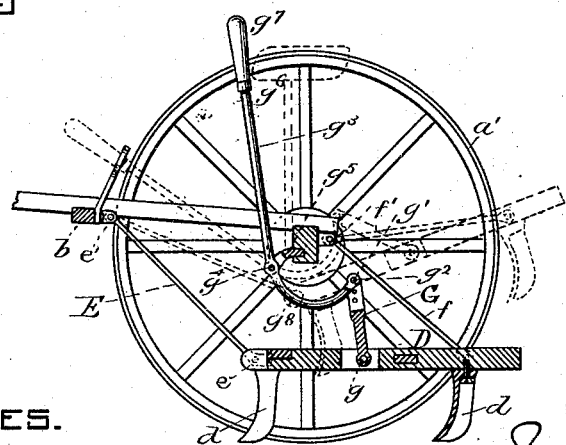
Figure 3:
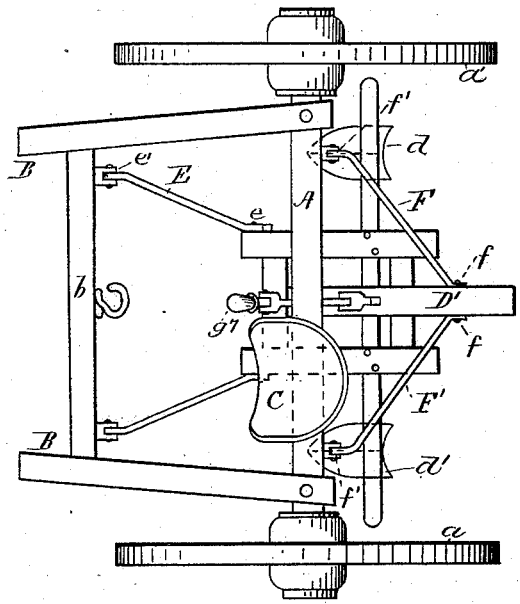
Figure 4:
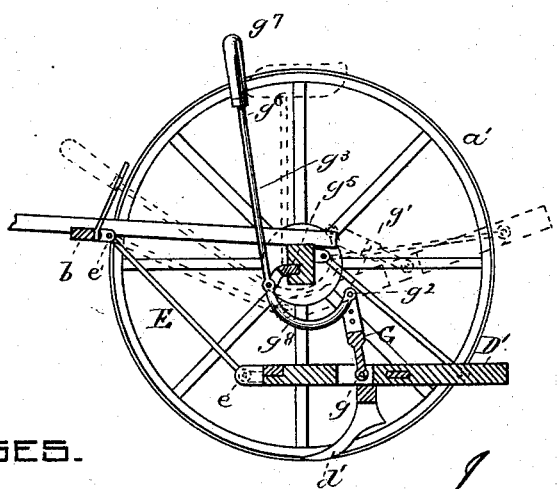

Figure 1 is a plan view of the cultivator. Fig. 2 is a view in vertical central section showing in full lines the cultivator down or in working position and in dotted outline the position of the cultivator when lifted. Fig. 3 represents a plan view of the invention used as a furrowing device; and Fig. 4 shows in vertical section the arrangement of the parts when in operation, and in dotted outline when elevated or lifted from the ground. Fig. 5 is a detail view.

The object of the invention is to provide a wheel cultivator and furrower of cheap and simple construction, not readily got out of order, and easily operated.

It consists, essentially, of an axle mounted on two wheels and shafts connected directly therewith and having a cross-bar, and the frame supporting the cultivator or furrowing teeth attached to the axle and cross-bar by pivoted rods, connections or braces extending downwardly from the axle and cross-bar of the shafts, respectively, as hereinafter specified.

It further consists in a device for lifting the frame-work of the cultivator or furrower which can also be utilized for exerting pressure thereon when it is in working position.

Referring to the drawings, A represents the axle; $a\ a'$, the wheel; B, the shafts; $b$, the cross-bar of the shafts, and C the driver's seat, which is attached by an arm directly to the axle.

D is the cultivator-frame, and D' the furrower-frame. These frames may of course be of any suitable shape and construction and may support as many teeth as may be desired, the cultivator-frame having its teeth $d$ arranged with special reference to cultivating, and the furrowing-frame having its teeth $d'$ arranged preferably upon a horizontal line with special reference to forming furrows. The frames are attached to the cross-bar $b$ by the front rods, E E', which are jointed or hinged at the points of connection $e$ with the frame D or D', and also at their points of connection $e'$ with the cross-bar $b$. These rods are of sufficient length to place the front portion of the cultivator or furrower frame well back of the bar $b$ and about under the axle $a$. The rear or back portion of these frames D D' is connected with the axle $a$ by means of the stay-rods F F'. The rods are bolted at their lower ends, $f$, to the cultivator or furrower frame and are pivoted at their upper ends, $f'$, to the axle, and they extend backward and downward from the axle, as represented in Figs. 2 and 4.

It will be seen by the above description that the cultivator or furrower frame is held attached to the axle and shafts by four connections, each extending backwardly therefrom, and so attached to the cultivator or furrower frame as to cause the teeth of the cultivator or furrower upon the movement thereof to be dragged into the soil, while at the same time it is held or stayed to the axle and shafts so that it cannot take a lateral direction, but must take a straight or uniform direction or course between the wheels. In other words, while the frame is attached to the axle and shaft so that it may drag, it is not permitted to have a lateral or sidewise movement in relation thereto.

In order to lift the teeth to clear obstructions, or for any other purpose, I have attached to the frame D or D' the link or rod G, which is pivoted at $g$, and is connected at $g'$ by a pin, $g^2$, with the end of the lever $g^3$. This lever is pivoted at $g^4$ to a bracket or support, $g^5$, extending forward from the axle, and it has the straight upper part, $g^6$, having the handle $g^7$, and the curved lower part, $g^8$, which extends backward from the pivot $g^4$ to the point where it takes hold of the rod $g'$. It will be seen that by this form of lever and method of connecting it to the axle and frame that upon the downward movement thereof the frame is lifted from the position shown in the full lines in Figs. 2 and 4 to that shown in the dotted lines of the same figures to a position substantially on that sweep; also, that by moving the arm $g^6$ backward that pressure is exerted through the rod $g'$ upon the frame to force it downward.

It will be seen from the peculiar manner of connecting the frame with the axle and shafts that the frame is easily disengaged from any obstruction by the driver without leaving his seat, as the lifting movement causes the frame and teeth to be lifted continuously upward during the entire extent of the throw of the lever; and, also, that by this construction the frame may be lifted to a high position, and that this is owing to the peculiar form of its connection with the axle and shafts.

I may use chains or any other suitable connections, instead of the rods E E', and I prefer to make the connection between the rods E E' and the frame at the points $e$ adjustable, in order that the elevation of the forward part of the frame may be varied. This adjustment, of course, may be had at the lower ends of the rods or at the upper ends, and in Fig. 5 I have shown a detailed view representing one of the rods and a portion of the frame whereby this adjustment is accomplished, the rod having a series of holes through one of which the fastening-bolt is arranged to pass, and by changing this hole the elevation of the frame is changed. There may also be a take-up connection between the end of the lever $g^3$ and the link or rods G.

When the device is used as a cultivator it is arranged upon the axle to provide sufficient room between it and the wheels for the rows or lines of vegetables or plants being cultivated.

I am aware of the Patents No. 109,129, dated May 8, 1870, to Henry Howe; No. 272,962, dated February 27, 1883, to John Kester, and No. 292,639, dated January 29, 1884, to Henry M. Ferguson, and of the devices therein described; but as the said patents do not describe a frame connected directly to the axle and shaft of the cultivator, as above described, and as they do not show means for swinging a frame in relation to the axle of a cultivator, as above indicated, I consider that they do not contain the essential features of my invention.

Having thus fully described my invention, I claim and desire to secure by Letters Patent of the United States—

1. A wheel cultivator or furrower having the axle A and shafts B, the frame D or D', supporting teeth, as specified, and the front rods or connections, E E', and the back rods, F F', attached to the frame and to the shafts and axle, as described, all substantially as set forth.

2. The combination of the axle A and shafts B, the frame D or D', supporting teeth, as specified, hung or attached to the axle and shafts by the rods or connections F F' E E', in the manner specified, the lever $g^3$, pivoted at $g^5$ and having the curved end $g^8$, and the connecting link or rod G, all substantially as specified.

IVORY LIBBEY.

Witnesses:
SAML. M. CAME,
WILLIAM EMERY.